Patented Apr. 5, 1932

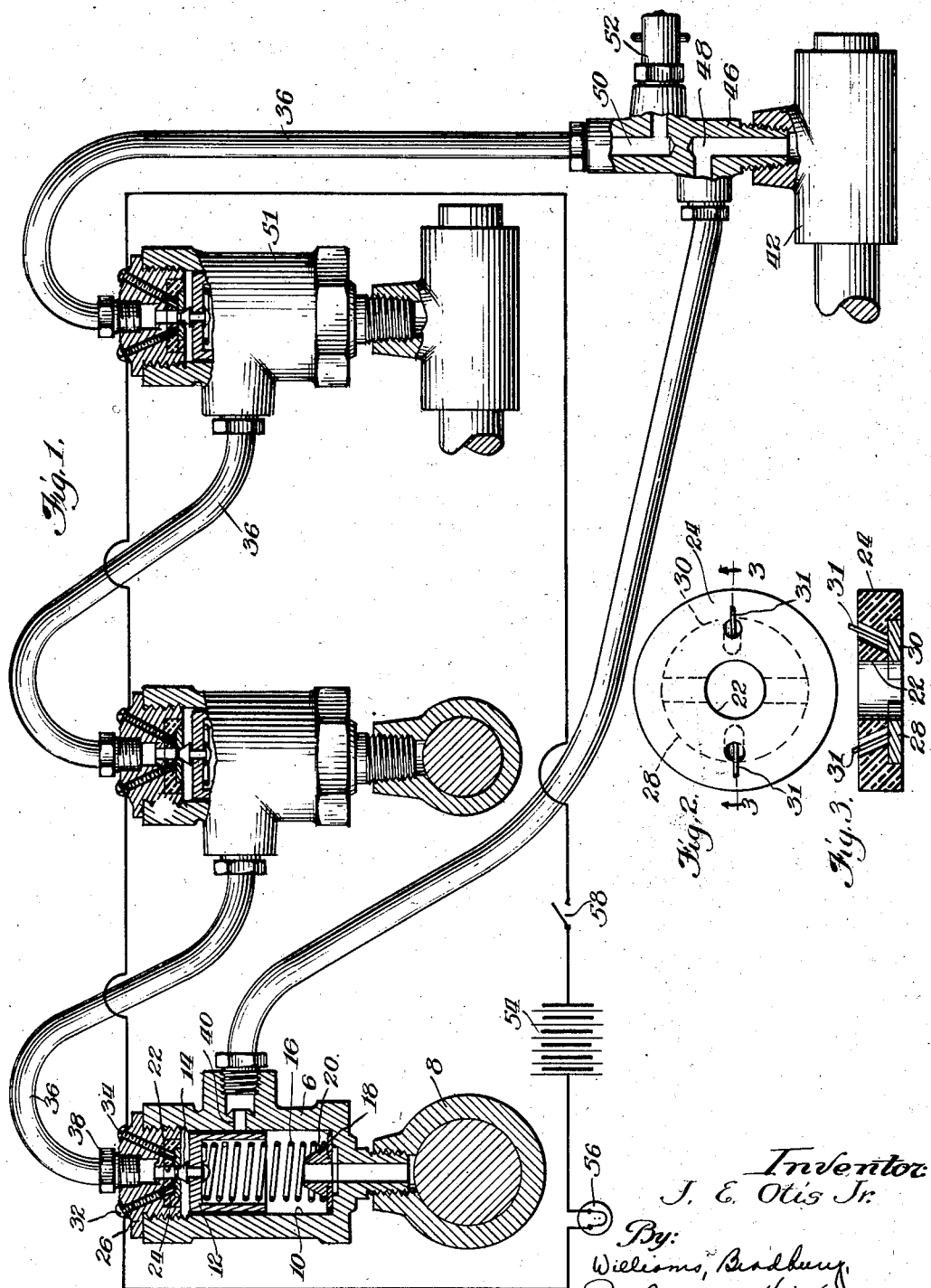

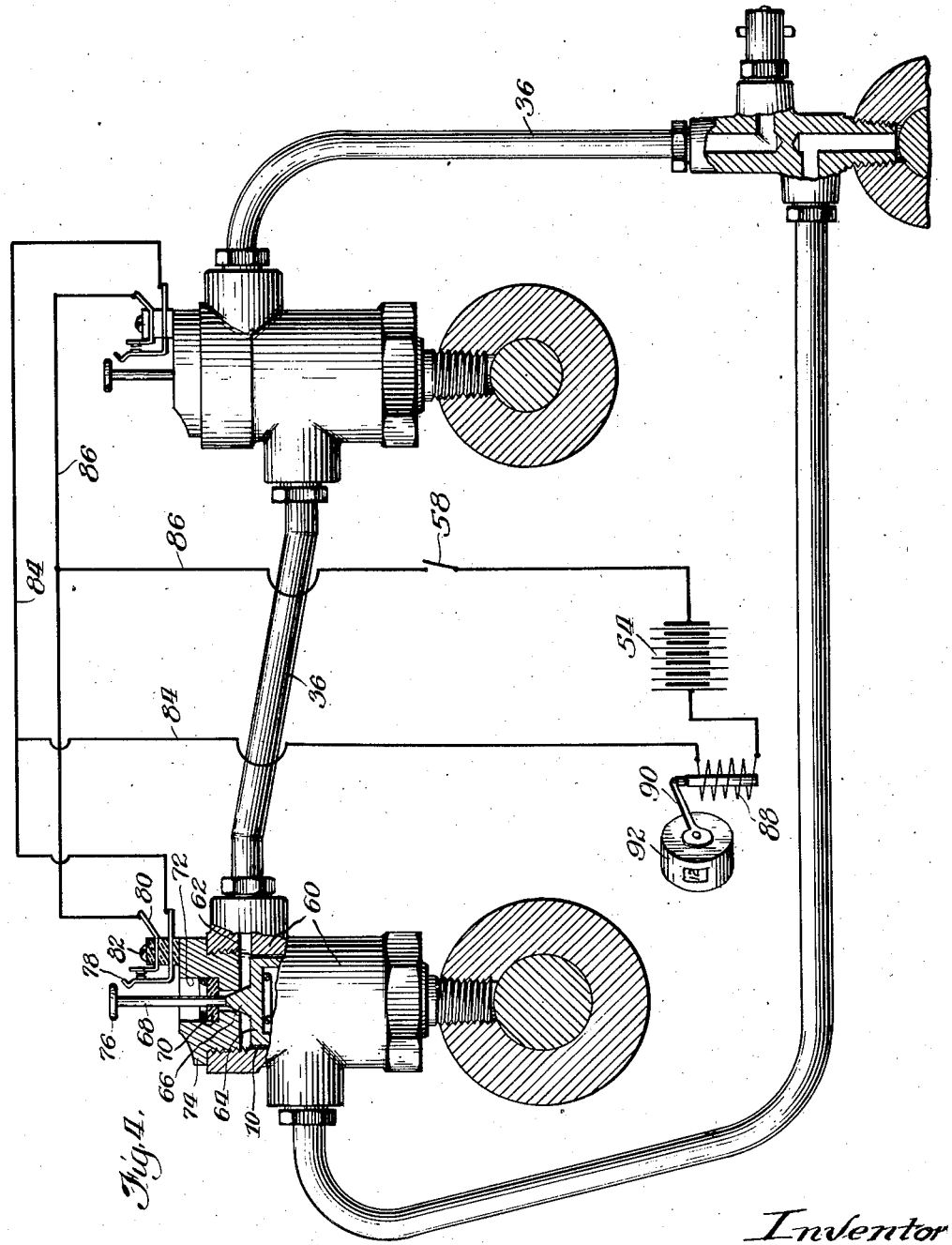

1,852,058

UNITED STATES PATENT OFFICE

JOSEPH E. OTIS, JR., OF WINNETKA, ILLINOIS, ASSIGNOR TO ALEMITE CORPORATION, A CORPORATION OF DELAWARE

LUBRICATING APPARATUS

Application filed December 27, 1927. Serial No. 242,540.

My invention relates generally to central lubricating systems and apparatus, and more particularly to signal means for indicating to the operator the fact that the measuring devices of the system have been properly operated.

It is an object of my invention to provide a signal system for a central lubricating system in which progressively operating measuring devices are employed, to indicate the operation of the measuring devices.

A further object of my invention is to provide means for indicating when the measuring devices of a progressive lubricating system have returned to normal positions.

Other objects will appear from the following description, reference being had to the accompanying drawings, in which Fig. 1 is a diagrammatic view of the signaling system as applied to progressively operating measuring devices to indicate the fact that all of the measuring devices are in normal positions;

Fig. 2 is an enlarged detail plan view of the insulating block used in the measuring devices;

Fig. 3 is a vertical section taken on the line 3—3 of Fig. 2; and

Fig. 4 is a diagrammatic view of a modified form of signal system wherein the operation of the measuring devices is indicated by a suitable register.

In lubricating systems of the series or progressive type, in which a plurality of bearings are lubricated from a single source and in which a measuring device adjacent each bearing is adapted to force a measured charge of lubricant to its bearing and then permit lubricant to flow to the next adjacent device of the series, it is highly desirable for the operator to know that all of the devices of the series have operated properly. There are two ways in which the measuring device may get out of order. One is that the measuring device may not operate to discharge the measured quantity and the other that the measuring device may not return to normal position after discharging the measured quantity of lubricant to its bearing. Since the measuring devices operate progressively, the failure of one of the devices to operate properly may affect the operation of the remaining devices in the series. It is therefore highly important that the condition of each device be ascertainable to the operator.

A lubricating system of the series progressive type is fully disclosed and described in the co-pending application of Ernest W. Davis, Serial No. 219,837, filed September 16, 1927, and will be but briefly described herein.

As shown in the left-hand portion of Fig. 1, the measuring device comprises a body 6 threaded into a bearing 8 having a cylindrical chamber 10. A piston valve 12 has a cone head electric current conducting rivet 14 at the center of its face. The piston valve 12 is normally urged upwardly by a spring 16, the lower end of which rests upon a gasket 18 and is centered by a bushing 20 and the upper end of which engages the inner end surface of the piston valve 12. When in its uppermost position the conical head of the rivet 14 serves as a valve to close an inlet port 22 formed in an insulating plug 24 set in the cap 26, the latter being threaded in the body 6. The plug 24 has a pair of arcuate copper or brass plates 28, 30 rigidly secured therein. These plates are connected by suitable conductors 31 with screws 32 and 34, respectively, which are insulated from the cap 26. The lubricant is supplied to the device through conduit 36 which is connected to the inlet passage 22 in the cap and secured thereto by bushing 38. The body 6 has an outlet passage 40 to which the conduit 36 leading to the next measuring device of the series is connected.

The first bearing 42 of the series has a suitable fitting 46 threaded therein. This fitting has two separate passageways 48 and 50. A suitable nipple 52, which serves as means for making a detachable connection with a source of lubricant under pressure, is threaded in the fitting 46 and communicates with the passageway 50. The other end of the passageway 50 is connected by a conduit 36 with the first measuring device 51 of the series and the outlet 40 of the last measuring device of the series is connected to one end of the passage 48. The other end of the passage 48 leads to the bearing 42.

The means for causing the visual signal comprises a source of electric current here represented by a battery 54 which is connected in series with a signal light 56 and the sets of screws 32 and 34 of the measuring devices of the series. A switch 58 is provided for controlling this circuit.

The operation of this system is as follows: The lubricant compressor is connected to the nipple 52 and lubricant, preferably grease, forced through the passage 50 and the conduit 36 to the first measuring device 51 of the series. As soon as the pressure is built up sufficiently the grease will force the piston valve 12 of the first device downwardly, thereby expelling the lubricant beneath the valve to the bearing. At the lower end of its stroke, the lower annular edge of the piston valve will seat upon the gasket 18, thereby preventing further flow to the bearing. As the valve approaches its lowermost position it will uncover the outlet passage 40 and permit the flow of lubricant to the next device of the series. The valves will thus operate progressively until the last device of the series, illustrated as attached to the bearing 8, has been operated, when lubricant will flow through the conduit 36 to the fittting 46 into the bearing 42. The operator will notice the extrusion of grease from this bearing and thereby be apprised that sufficient lubricant has been forced into the system. He will thereupon disconnect the compressor.

Upon relief of the pressure in the conduits 36 and in the measuring devices (due to slight leakage to the bearings), the springs 16 will force the piston valves upwardly until the cone heads of the rivets 14 again seat against and close the inlet passages 22. During the upward stroke of the piston valve 12 the lubricant may leak between the side walls of the valve and the walls of the cylinder from the space above the piston to that formed beneath the piston valve, since there is sufficient clearance (exaggerated in the drawings) between the piston valve and its cylinder.

As soon as all of the piston valves have returned to normal position the circuit through the signal lamp 56 will be completed, since the rivets 14 of each of the devices will close the circuit between their contact plates 28 and 30. If upon closing the switch 58 the signal lamp 56 fails to light, the operator is warned that all of the piston valves have not returned to normal position and he may thereupon test each individual measuring device with suitable apparatus to discover in which particular measuring device the piston valve has not returned to its normal position. and thereupon clean or repair that device. While I have illustrated my invention as applied to the lubrication of four bearings, it is to be understood that there may be as many as twenty-five or more bearings thus lubricated as a single system.

In Fig. 4, I have shown a somewhat similar system in which similar parts have been represented by similar reference characters. The measuring device disclosed in Fig. 4 comprises a body 60 which is substantially similar to the body 6 except that its inlet port 62 is located at the side of the upper end of the cylindrical chamber 10. The piston valve 64 also differs slightly in that the conical projection 66 is made integral with the piston valve 64 and has a stem 68 integral with or secured thereto. The stem 68 is slidable in a bushing 70 which is fitted and secured in a recess 72 formed in a cap 74. The upper end of the stem 68 has a head 76 which upon downward movement of the piston valve is adapted to engage a spring finger 78 which carries a contact point. This contact point is adapted to complete a circuit by being pressed against a contact point upon a connector 80. The finger 78 and connector 80 are insulated from each other and from the cap 74 and are secured to the cap by screws 82. The spring fingers 78 and the connectors 80 of all of the devices are connected in parallel by conductors 84 and 86 which are in series with a manually operable switch 58, battery 54 and the winding of a solenoid 88. The plunger of the solenoid is pivotally connected to an arm 90 which forms part of an odometer 92 which may be of any well-known construction and is adapted to count the number of times the plunger of the solenoid is actuated.

The operation of the system shown in Fig. 4 is similar to that previously described with reference to Figs. 1, 2 and 3, with the exception of the operation of the signal circuit. As each of the piston valves 64 moves downwardly to eject the charge of lubricant to the bearing, the head 76 of its stem 68 engages the spring finger 78 and makes an electric contact with the connector 80, thus completing a circuit through the solenoid 88. In this manner, as each measuring device operates, its operation will be indicated upon the register 92. Knowing the number of measuring devices in the system, the operator can readily determine by a glance at the register 92 whether or not all of the measuring devices have been properly operated. In the event that the number appearing upon the register does not tally with the number of measuring devices in the series, the operator can readily determine from an inspection of the measuring devices whether or not they have been properly operated by noting the positions of their stems 68.

The signal circuit 84, 86 is also closed by each device as its piston valve returns to its upper or normal position, so that the register will be actuated twice for each device if the switch 58 is left closed during the period while the piston valves are returning to normal position. Under ordinary conditions the piston valves return to their normal positions in order inverse to their discharging sequence of operation so that the possibility of an inaccurate registration, due to contemporaneous closure of the contacts on two of the devices, is very remote. Under certain circumstances, such contemporaneous closure of the contacts on two or more of the measuring devices would be an indication of improper operation and the indication of the odometer would therefore serve to apprise the operator of the condition.

The signal system of my invention obviates the necessity of the operator making an inspection of each of the devices of the system after each lubricating operation and thereby effects a great saving of time and labor, since the measuring devices may be distributed over all parts of a machine, many of which may be relatively inaccessible and remote from the operator.

While I have shown and described particular embodiments of my invention, it will be apparent to those skilled in the art that various modifications thereof may be made without departure from the basic principles of my invention. I therefore desire the scope of my invention to be limited only by the claims which follow.

I claim:

1. In a central series progressive lubricating system, the combination of a plurality of bearings to be lubricated, a measuring device associated with each of said bearings, conduits connecting said devices for supplying lubricant thereto, an element in each of said devices operable to eject lubricant therefrom, an electric signal circuit associated with said devices, and means connected to each of said elements for closing a gap in said circuit.

2. In a system of the class described, the combination of a plurality of bearings to be lubricated, a plurality of progressively operated measuring devices, one associated with each of said bearings, conduit means for connecting said devices in series, and means associated with each of said devices and automatically operable upon completion of the measuring operation to close an electric signal circuit.

3. In a central lubricating system, a plurality of bearings to be lubricated, measuring devices associated with said bearings, an element in each of said devices movable upon actuation of said device, and an electric signal circuit arranged to be completed upon a predetermined movement of said element.

4. In a central lubricating system, the combination of a plurality of bearings to be lubricated, a measuring device associated with each of said bearings, a movable element in each of said devices, a normally open electric signal circuit associated with said devices, contact means in said circuit arranged to be closed upon a predetermined movement of said element, thereby to complete said signal circuit, and registering means operable upon each completion of said signal circuit to indicate the number of elements which have moved.

5. In a central lubricating system, the combination of a plurality of bearings, a plurality of measuring devices adapted to be operated serially to force measured charges of lubricant to their associated bearings, electrical contact means operated incident to the operation of said devices, an electrical circuit connecting said contact means in parallel, means for energizing said circuit, a solenoid in said circuit and a register operable by said solenoid whereby the operation of said devices will be indicated on said register.

6. In a central lubricating system, a plurality of bearings to be lubricated, a measuring device associated with each of said bearings, an element in each of said devices reciprocable in the normal operation thereof, and means operable by said element to close an electrical circuit during a short interval of both its forward and return strokes.

7. A central lubricating system comprising a plurality of bearings to be lubricated, a measuring device associated with each of said bearings, a reciprocable element in each of said devices, an operative connection between said elements and said register for actuating said register upon the forward and return strokes of each of said elements.

8. In a central lubricating system, the combination of a plurality of bearings to be lubricated, a measuring device associated with each of said bearings, a element in each of said devices movable from normal position to eject lubricant therefrom, a stem thereon projecting from said measuring device, an electric signal circuit including a switch positioned on said measuring device, said stem adapted to close said switch upon an operation of said measuring device.

9. In a centralized lubricating system, the combination of a plurality of bearings to be lubricated, a lubricant measuring device associated with each of said bearings, an element in each of said devices movable from normal position to eject lubricant therefrom, a stem attached to said element projecting from said measuring device, and an electric signal circuit, including a switch positioned in each of said measuring devices, and said stem arranged to close said switch twice in the normal operation of the measuring device.

10. In a centralized lubricating system, the combination of a plurality of bearings to be lubricated, measuring valves associated with said bearings, conduits connected with said valves for supplying lubricant thereto, an electrical contact switch in each of said devices, a signal circuit including said contact switches and a signal connected in series, and means in each of said devices for closing its contact switch upon completion of an operative cycle thereof.

11. In a centralized lubricating system, the combination of a plurality of measuring devices each associated with a bearing to be lubricated, a conduit connecting said devices for supplying lubricant thereto, each of said devices having a normally open portion of an electrical circuit incorporated therewith and means operative upon completion of a cycle of operation of the device to close said normally open portion of the electrical circuit, signalling means, and conductors connecting said signalling means with said normally open portions of the circuit.

In witness whereof, I hereunto subscribe my name this 19th day of December, 1927.

JOSEPH E. OTIS, Jr.